United States Patent [19]
Lohr

[11] Patent Number: 5,853,280
[45] Date of Patent: *Dec. 29, 1998

[54] SEMITRAILER FOR VEHICLE TRANSPORATION WITH REMOVABLE UPPER PLATFORM

[75] Inventor: Robert Lohr, Hangenbieten, France

[73] Assignee: Lohr Industrie, Hangenbieten, France

[ * ] Notice: This patent issued on a continued prosecution application filed under 37 CFR 1.53(d), and is subject to the twenty year patent term provisions of 35 U.S.C. 154(a)(2).

[21] Appl. No.: 528,089

[22] Filed: Sep. 14, 1995

[30] Foreign Application Priority Data

Sep. 23, 1994 [FR] France ................................ 94-11552

[51] Int. Cl.⁶ ............................................ B60P 1/28
[52] U.S. Cl. ................... 414/482; 414/481; 414/495; 414/786; 410/24; 410/26; 410/29
[58] Field of Search .................. 410/4, 24, 26, 410/27, 29, 29.1; 414/495, 481, 482, 484, 485, 786, 471, 537, 333; 105/340, 355, 370; 280/763.1, 764.1, 765.1, 766.1

[56] References Cited

U.S. PATENT DOCUMENTS

| | | | |
|---|---|---|---|
| 3,292,802 | 12/1966 | Hutchinson | 414/484 |
| 3,292,803 | 12/1966 | Keller et al. | 414/484 |
| 3,894,747 | 7/1975 | Wisdom et al. | 414/482 |
| 4,875,821 | 10/1989 | Oren | 410/4 X |
| 5,051,046 | 9/1991 | Oren | 410/26 X |
| 5,106,246 | 4/1992 | Chance | 410/26 |
| 5,593,272 | 1/1997 | Green | 414/498 |

FOREIGN PATENT DOCUMENTS

| | | |
|---|---|---|
| 2680492 | 5/1994 | France . |
| 2688179 | 10/1996 | France . |
| 2688180 | 1/1997 | France . |

*Primary Examiner*—Stephen T. Gordon
*Attorney, Agent, or Firm*—Davis and Bujold

[57] ABSTRACT

A semitrailer (1) comprising a front end having a support and lifting mechanism (7), on the undersurface of a chassis (2), for lowering and raising the semitrailer (1) to facilitate loading and unloading of the semitrailer (1) and movement thereof. The semitrailer (1) includes an upper platform (14) which is vertically movable along poles (17, 18) of the chassis under the action of an independent pair of lifting devices. The upper platform (14) acts as an upper loading platform, in the case of vehicle transport, and as a roof structure for transport of other items. The semitrailer (1) is useful to manufacturers of articulated vehicles especially of the vehicle transporting type.

19 Claims, 12 Drawing Sheets ized as a tractor. Secondly, their maximum loading and transporting capacity or useful load is significant, since it is in the vicinity of at least 30 tonnes and may exceed this value in the case of a lighter structure, for example aluminium. Finally, efforts at standardisation of construction and at the level of coupling means have substantially lowered the cost price.

SEMITRAILER FOR VEHICLE TRANSPORATION WITH REMOVABLE UPPER PLATFORM

FIELD OF THE INVENTION

The invention relates to an inclinable semitrailer, the method of loading/unloading thereof and the associated method relating to its incorporation as a load in or on a railroad carrying structure.

TECHNOLOGICAL BACKGROUND TO THE INVENTION

Semitrailers exhibit various notable advantages in the field of road transport. First of all, there is their logistical independence with respect to the tractive unit known as a tractor. Secondly, their maximum loading and transporting capacity or useful load is significant, since it is in the vicinity of at least 30 tonnes and may exceed this value in the case of a lighter structure, for example aluminium. Finally, efforts at standardisation of construction and at the level of coupling means have substantially lowered the cost price.

Other than the limitation placed on their length by European national road laws, semitrailers do not exhibit any particular disadvantages relating to their use as vehicle transporters. They may, in fact, be provided with the majority of equipment and devices specific to this type of load.

Moreover, in the context of mixed rail/road transport and more generally of piggyback traffic, the constructors of railroad stock and the constructors of road vehicles have proposed various interesting options for rapid loading/unloading operations of road vehicles directly onto bogie truck wagons.

One of these options already patented by the Applicant as FR-A-2 680 492, FR-A-2 688 179 and FR-A-2 688 180 consists in using a railroad carrying structure with low floor, one of the ends of which is open and formed as a side sill, this being the end at which the wagon structure is mounted disconnectably on the bogie truck.

The other end is closed and is mounted pivotally on the railroad bogie truck. It constitutes a pivoting member ensuring the tractive connection and the disengaging movement from the wagon structure with a view to its oblique presentation for the operations of positioning and removing a semitrailer by the simple use of its tractor.

Longitudinal disconnection is likewise provided, by which the wagon structure is released after disconnection of the bogie truck and removal of the structure directly adjacent the end which has been released.

However, this system requires, in its two embodiments, the intervention of an external means or of means integrated in the wagon structure ensuring lifting of the side sill end for disengagement thereof from the bogie truck and support thereof during the movements of disengagement/engagement and pivoting/disengagement of the assembly.

AIMS OF THE INVENTION

The present invention has a double aim, firstly, within the context of a road vehicle, to confer to this semitrailer-type road vehicle new and significant advantages decisive in the transportation of cars and secondly, within the context of application to rail/road transport, to provide a technically and economically optimum solution for the transfer and mounting of a semitrailer on a railroad structure totally autonomously with respect to the use of external members.

This double aim is achieved with the semitrailer according to the invention, which may load, unload and transport vehicles and be mounted on railroad trains.

SUMMARY OF THE INVENTION

To this end, it comprises a chassis, a wheel and axle set carrying the chassis, a lower loading plane and a body formed of at least four corner poles in two transverse frames and is characterized in that it comprises towards the front and on the under surface of its chassis a support and lifting means, connected to a drive fluid connection interface for inclined forwards lowering and raising, and an upper loading platform which is vertically mobile under the action of independently controlled and functioning raising devices between each transverse frame, said upper platform inclining into the vehicle loading position or acting as a roof structure in the case of conventional freight transportation.

This autonomy significantly simplifies the stock used and the loading, unloading and transfer handling operations.

Thus, it is no longer necessary to involve external lifting means or to complicate the construction of the wagon structure by providing props or other integral lifting means.

Moreover, if external means of positioning vehicle transporting semitrailers on wagon structures or removing them therefrom are not available, it proves useful to be able to load or unload the transported vehicles when the semitrailers are already or still in place on the wagon structure. This possibility is of particular interest in waiting yards having a branch railroad line at the manufacturers' or at regional or national depots.

Thus, the invention confers numerous important advantages on semitrailers in their use for vehicle transport in addition to the well-known advantage of releasing the tractor after their arrival at their destination.

They may in particular be loaded and unloaded with vehicles in the absence of the tractor and they act individually as motive means in the phase of manoeuvring the wagon structure in the case of mixed rail/road transport.

BRIEF DESCRIPTION OF THE DRAWINGS

The technical characteristics and other advantages of the invention are recorded in the following description, effected by way of non-limiting example by means of one embodiment with reference to the accompanying drawings, in which:

FIG. 6: alignment or disalignment of the wagon structure;

FIG. 7: engagement or disengagement with the bogie truck;

FIG. 8: position inclined to the ground or lifting from the ground;

FIG. 9: individual unloading of the cars;

FIGS. 10 and 11: removal of the semitrailer by tractor;

FIG. 12: semitrailer in place and constituted railroad train.

DETAILED DESCRIPTION OF THE ILLUSTRATED EMBODIMENTS

Figure 1:
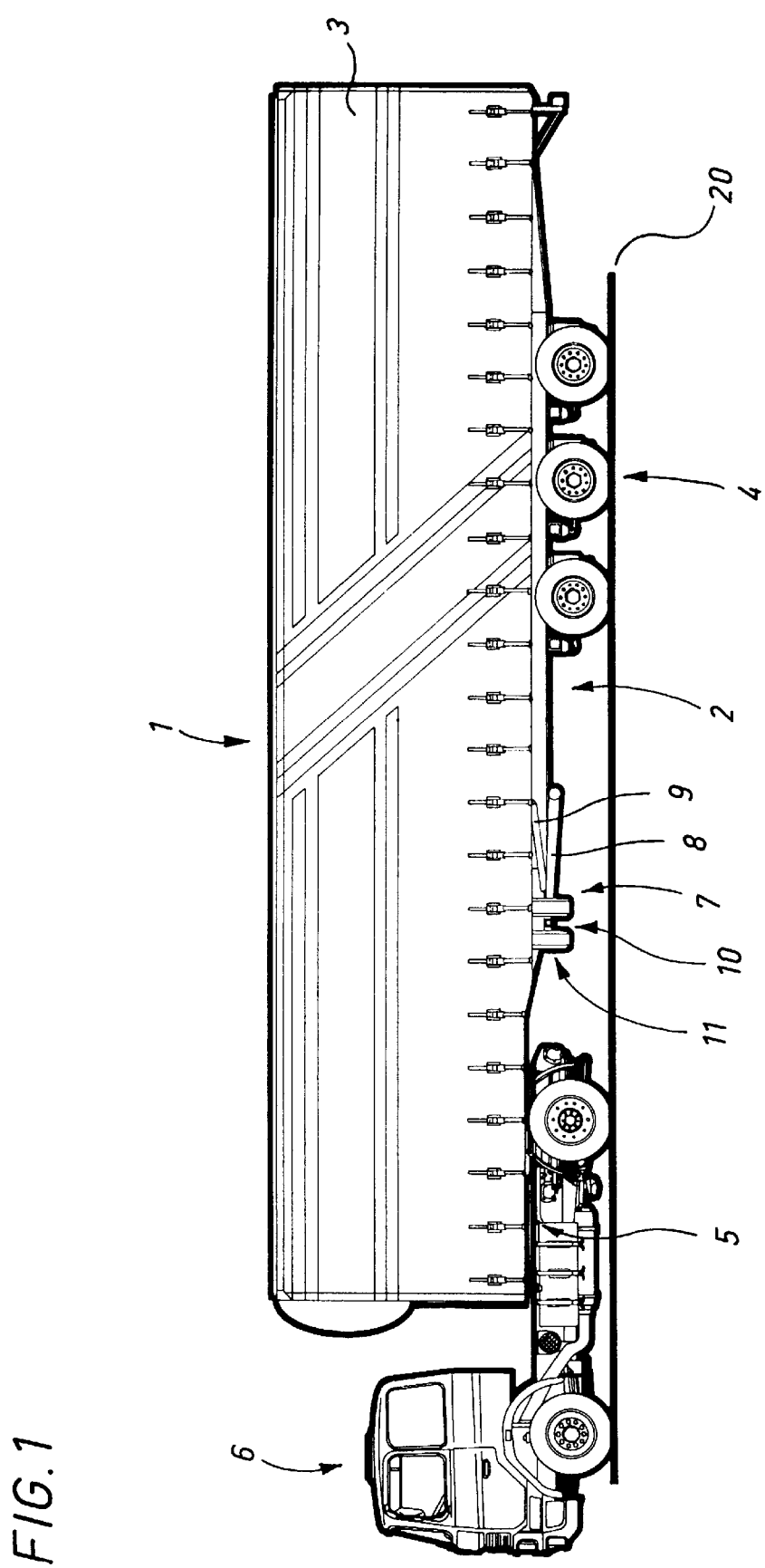
FIG. 1 is a profile view of any semitrailer coupled up and provided with support and lifting means.
Figure 2:
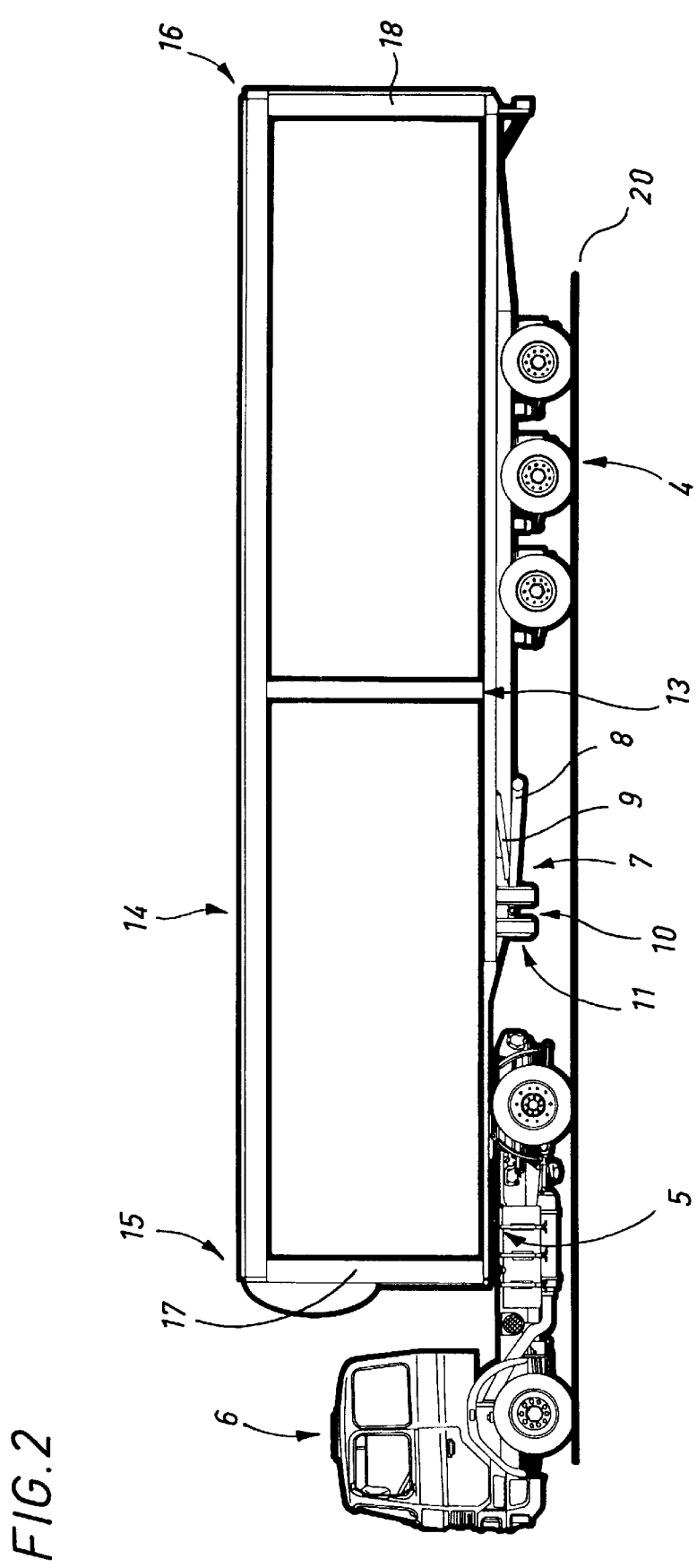
FIG. 2 is a profile view of an inclinable car transporting semitrailer comprising the same support and lifting means.

In non-specialised transport, such as is shown in FIG. 1, a semitrailer 1 conventionally comprises a chassis 2 surmounted by protection by tarpaulin 3 or other means, a multi-axle wheel set 4 supporting the chassis 2 and a coupling means 5 of the key-man type, interacting with the fifth wheel installed on a motive vehicle of the tractor type 6.

According to one of the original features of the invention, the chassis 2 comprises on its under surface and towards the front, for example approximately at the position of the traditional support props, a support and lifting means 7 actuated electrically or hydraulically and preferably remote-controlled.

The main function of this means relates to support, inclination and lifting. Optionally, it connects or rearranges the rolling and lifting functions. It is generally constrained in that it must be able to lower itself sufficiently for the front end of the semitrailer to come into contact with the ground.

This support and lifting means may assume different technical forms. First of all, it may comprise telescopic props or a pivoting arm actuated by a mechanical means or, more completely, a true rolling set liftable under the action of an operating jack.

This means is shown in general in the Figures. It comprises a pivoting arm 8 actuated by a jack 9. It is supplied with energy by an interface unit (not shown) which receives by rapid connection an energy link coming from an external source generally provided at terminals or port areas or depots.

The means of actuating the arm 8 may be supplied autonomously, that is to say from an energy source loaded on the semitrailer.

This arm 8 is provided at its free end with a bearing plate, a shoe or any other surface providing bearing contact with the ground. The embodiment shown comprises at this free end a rolling means in the form of a rolling assembly 10 formed of twin wheels equipped with tires and carried by a wheel shaft 11 mounted at the free end of the arm. The other end of this arm 8 is articulated pivotally to the chassis 2 of the semitrailer 1.

This rolling means has a fixed transverse direction or variable orientation. It is motorised, for example, to improve the autonomous nature of the manoeuvres.

From observation of the Figures relating to implementation of the semitrailer 1 shown by way of example, it seems that the support and lifting means 7 may act as an additional rolling set for manoeuvring, that is to say it ensures not only the functions of inclined lowering and raising of the semi-trailer but also its displacement during manoeuvring in the manner of a jockey wheel.

This latter characteristic does not always apply.

In the particular case of the transportation of cars such as 12 and more generally of vehicles, the semitrailer is equipped with a fixed lower loading plane 13 in the form of flooring or with a floor and an upper loading platform 14 which is vertically mobile in horizontal presentation or inclined along bents, for example in the form of two transverse frames 15 and 16 of corresponding identical corner poles 17 and 18, by the action of lifting devices provided in these poles, not visible in the Figures.

These devices for displacing the upper platform 14 are independently controlled and independent of function. They are of the type, for example, comprising a screw and insert nut. Thus, the upper loading platform 14 may assume a forwardly inclined position which, combined with the general inclination of the semitrailer 1 and with the possible addition of an access ramp 19 provided if necessary, permits the cars to arrive without damage and autonomously at their transportation position on the lower plane 13 or the upper loading platform 14.

It should be noted that the upper platform 14 acts as a roof or roof structure in the case of other types of transport. It may thus rapidly and easily, by a single manoeuvre followed by minor adaptations, change from one type of specialised car-transporting loading to general freight loading.

Figure 3:
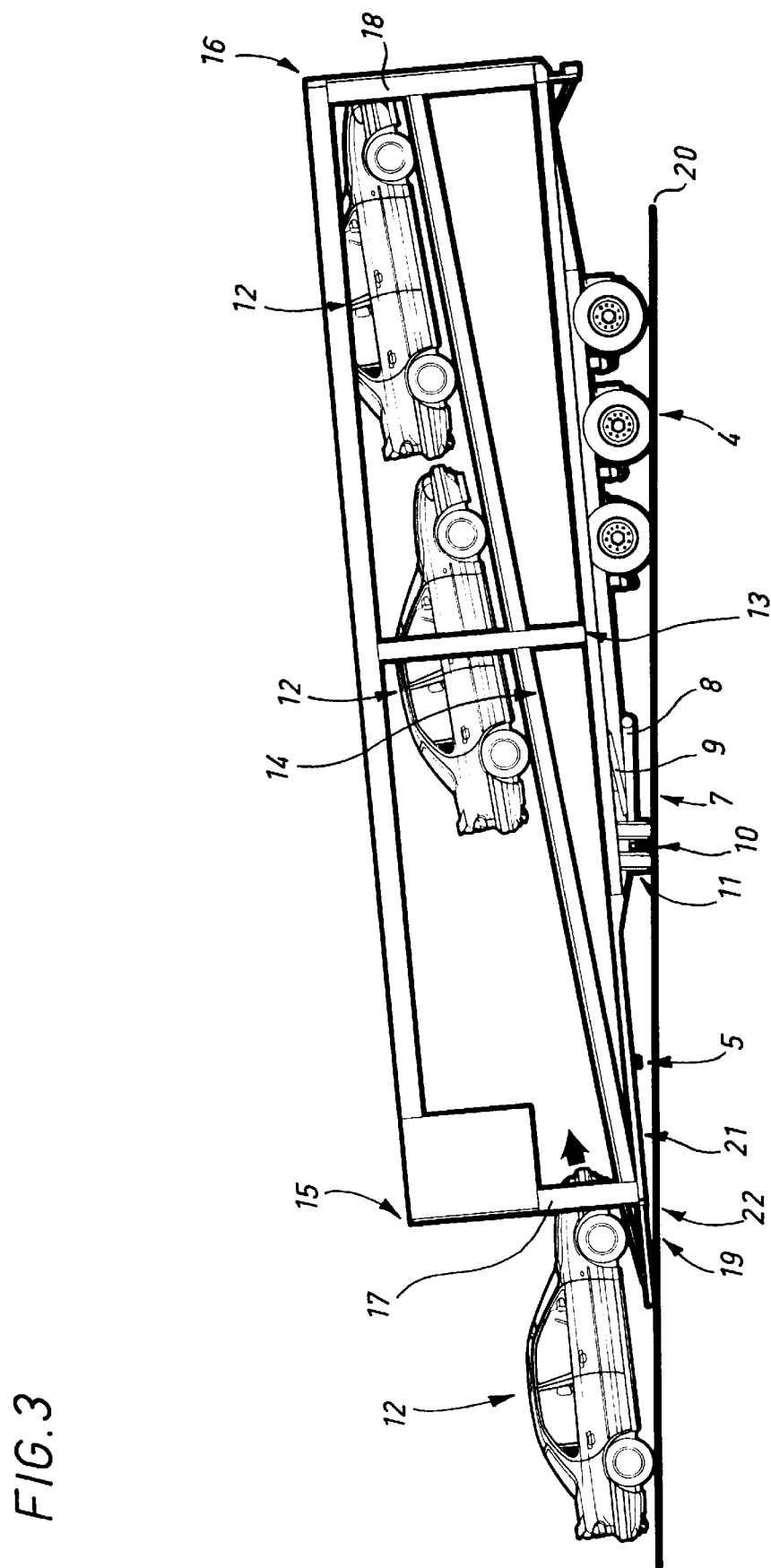
FIGS. 3 and 4 are profile views showing the inclinable car transporting semitrailer of FIG. 2 in two characteristic loading phases.
Figure 4:
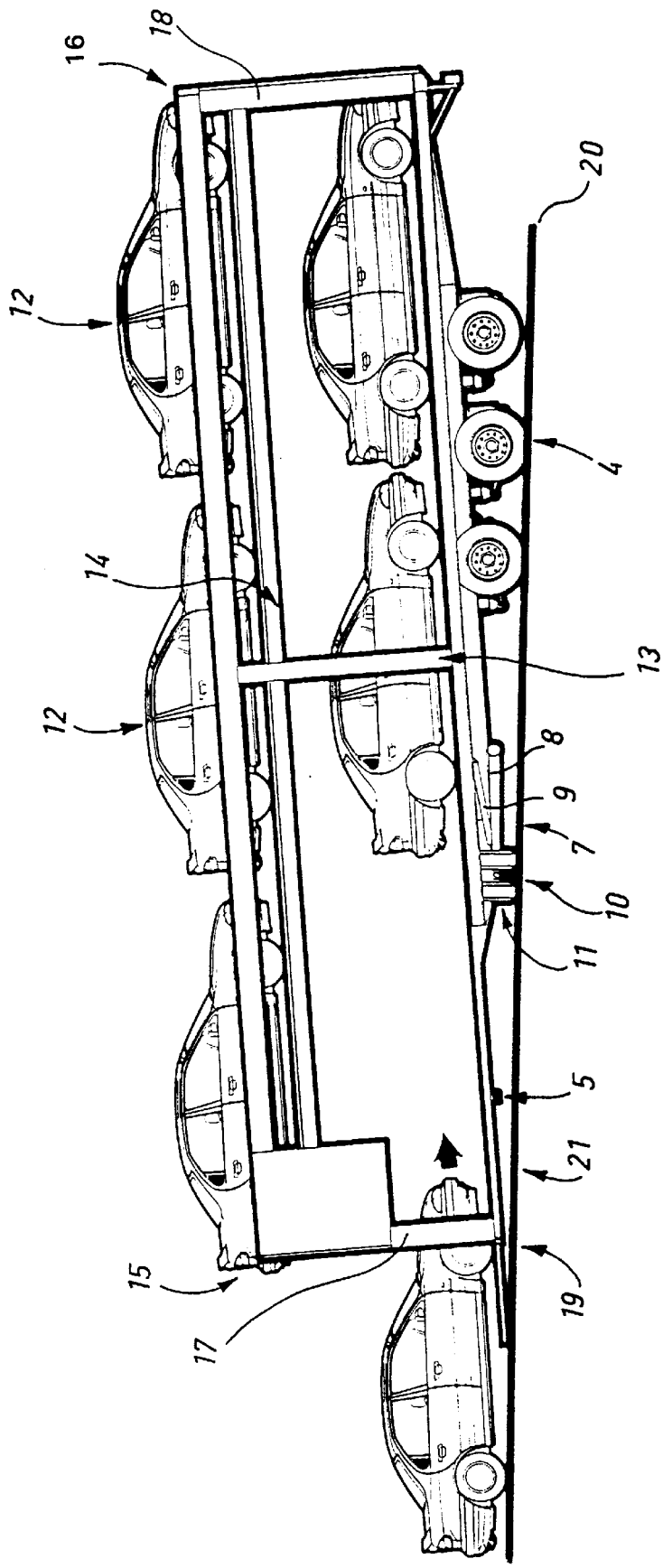
Figure 5:
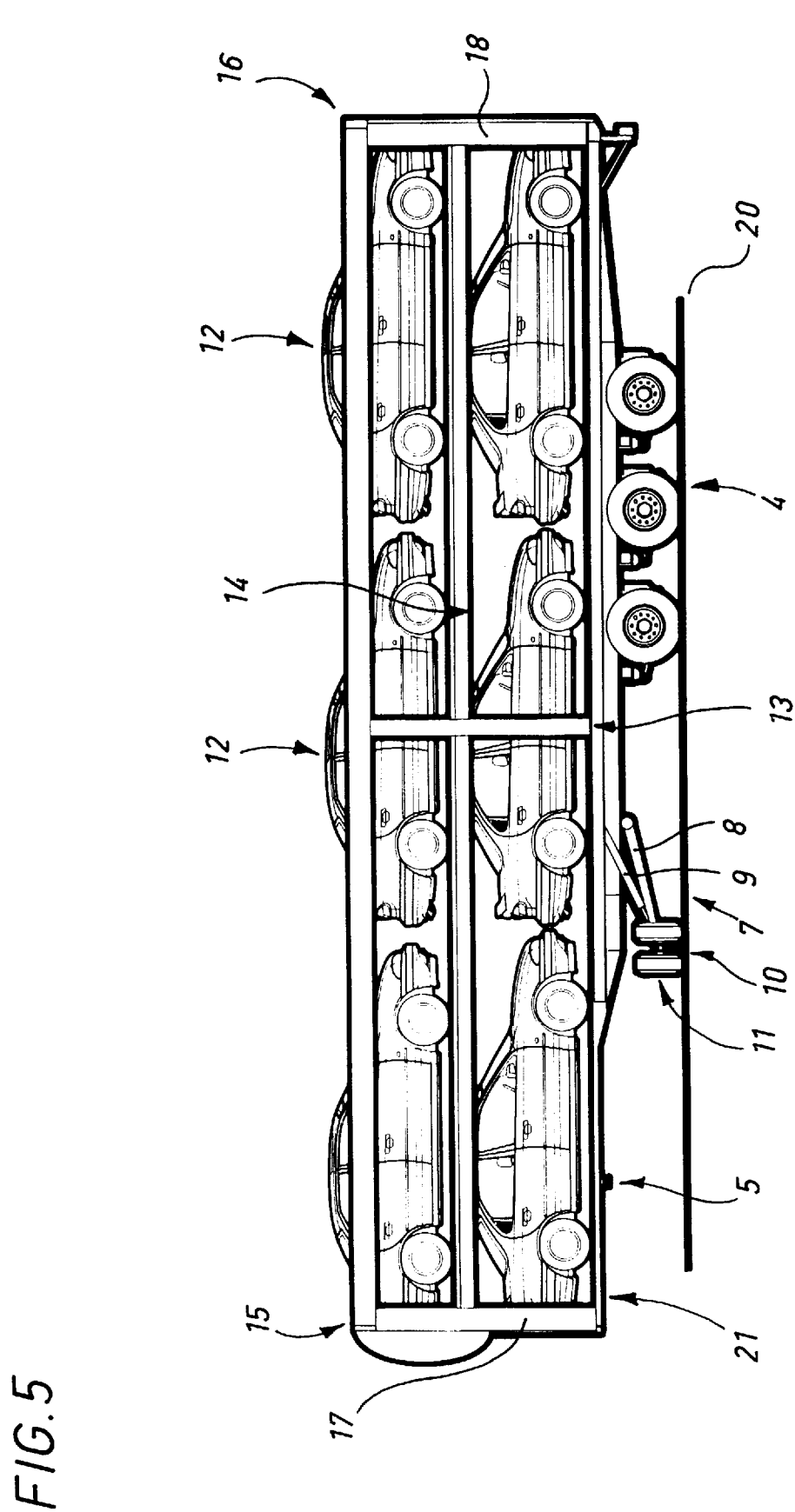
FIG. 5 is a profile view showing the semitrailer in the horizontal position, fully loaded with cars.
Figure 6:
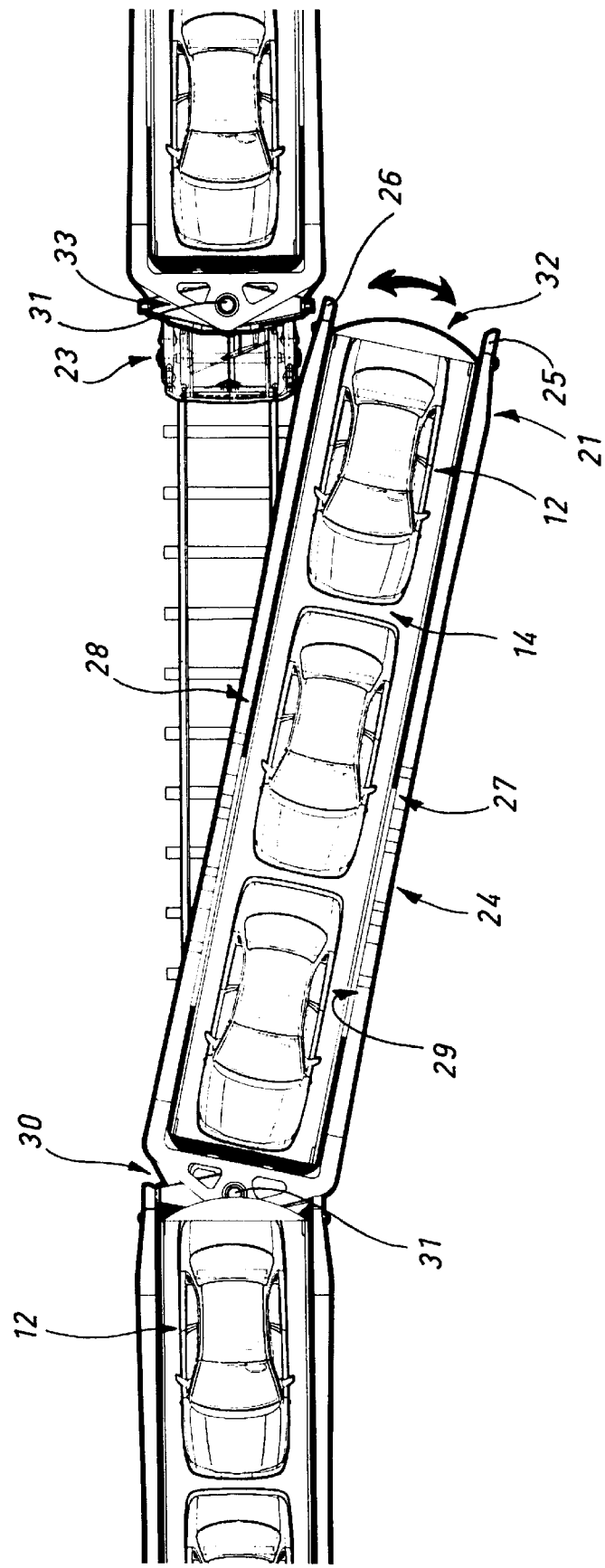
FIGS. 6 to 12 are profile and plan views illustrating phases of manoeuvring the railroad structure in use of the above semitrailer in railroad transport for which it constitutes the load.
Figure 7:
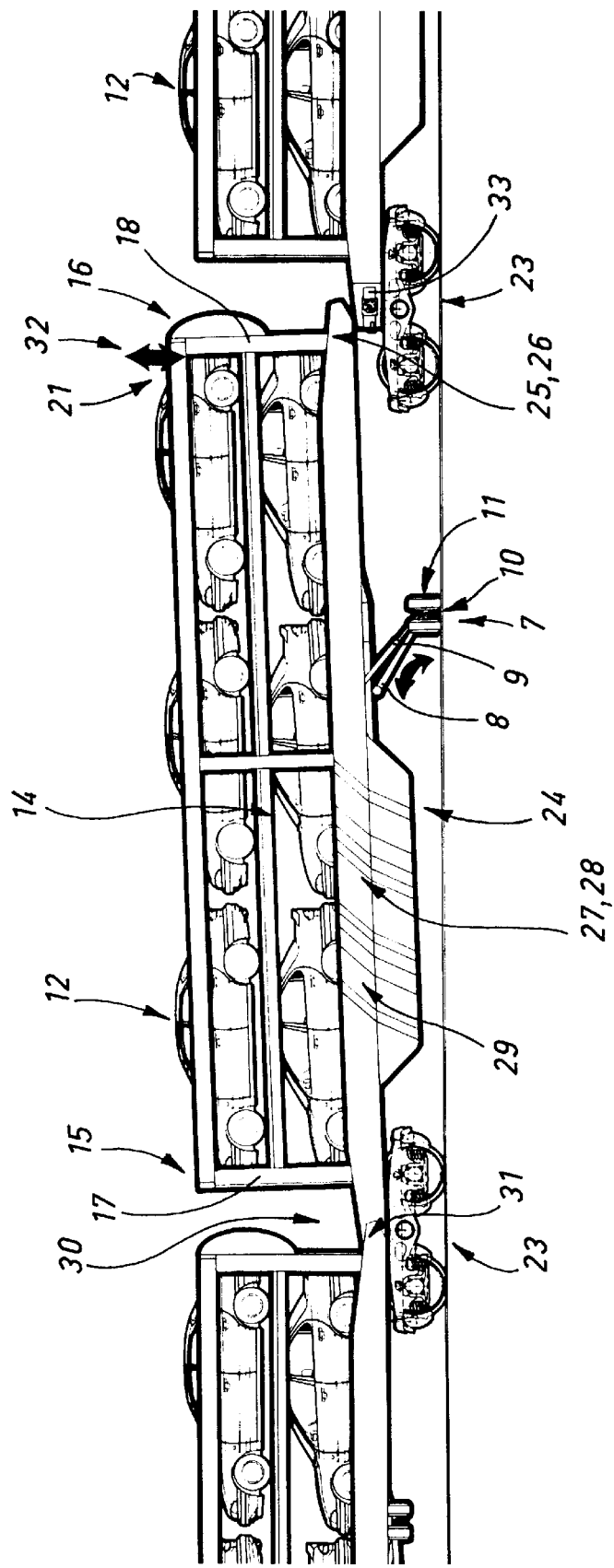
Figure 8:
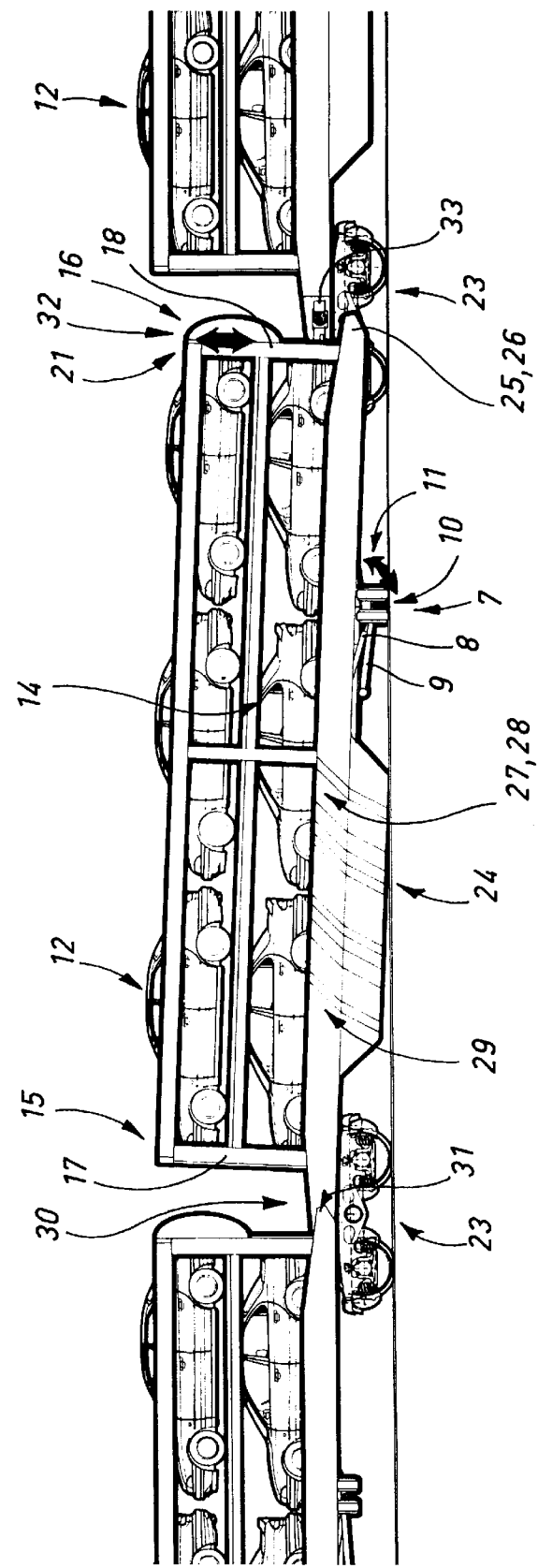
Figure 9:
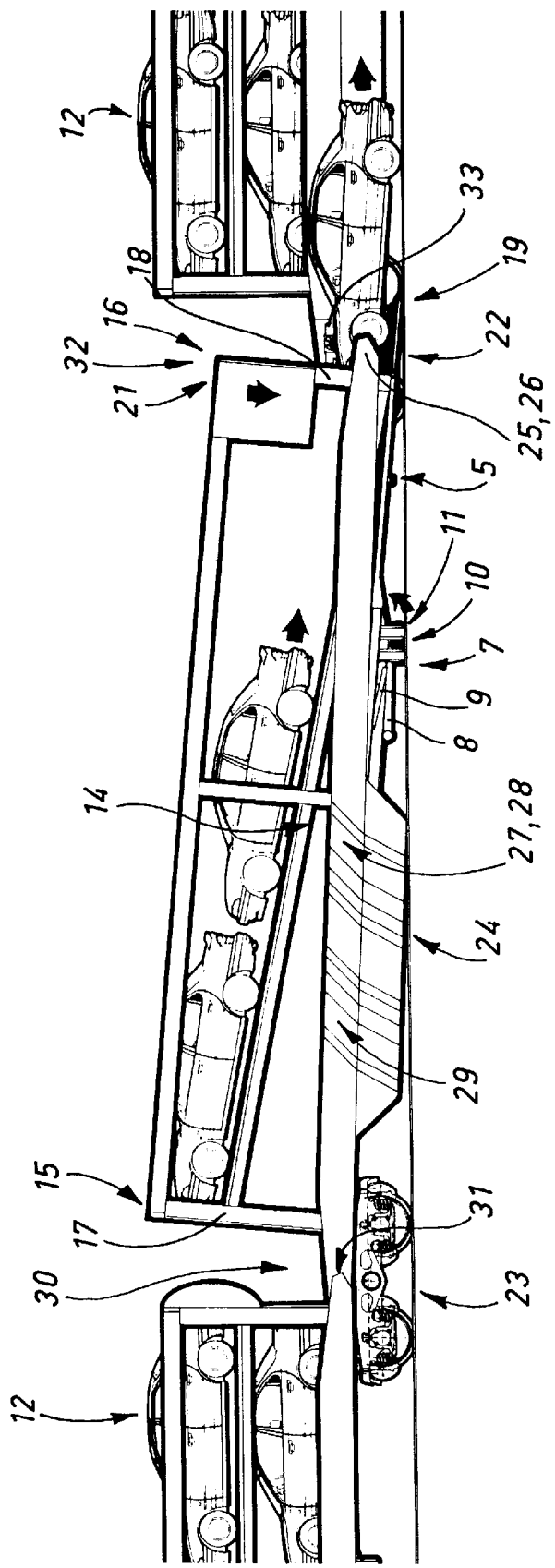
Figure 10:
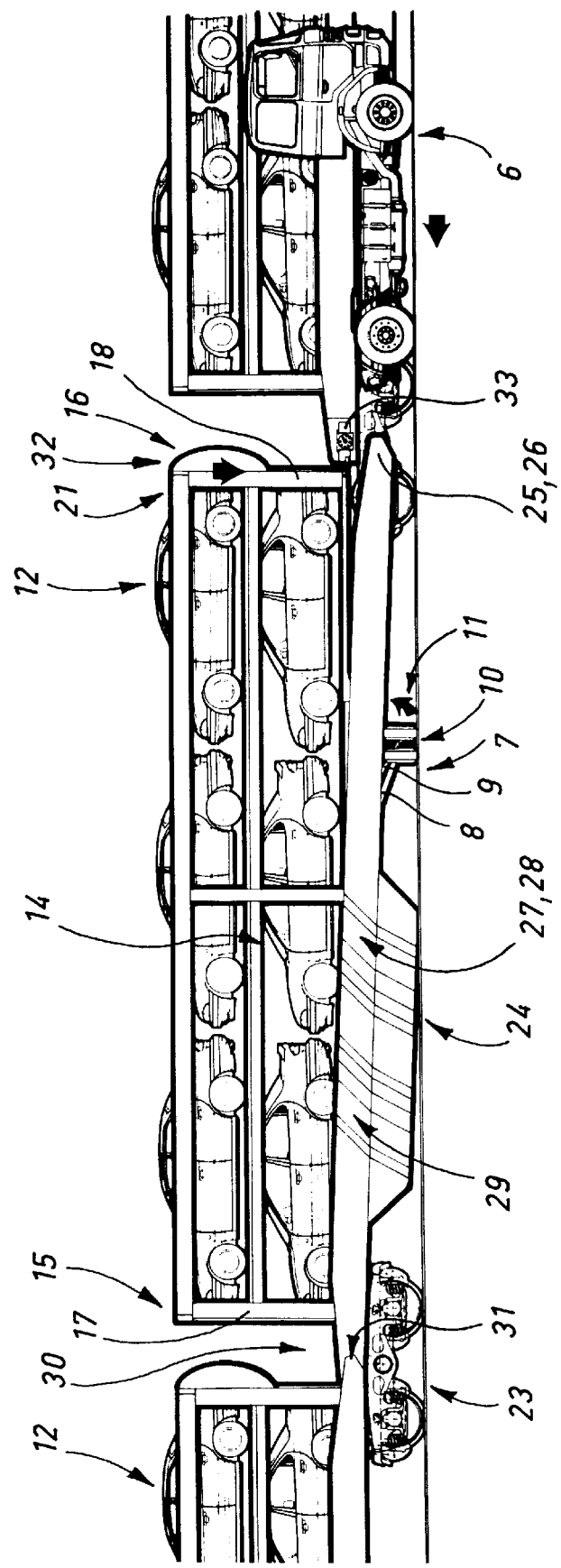
Figure 11:
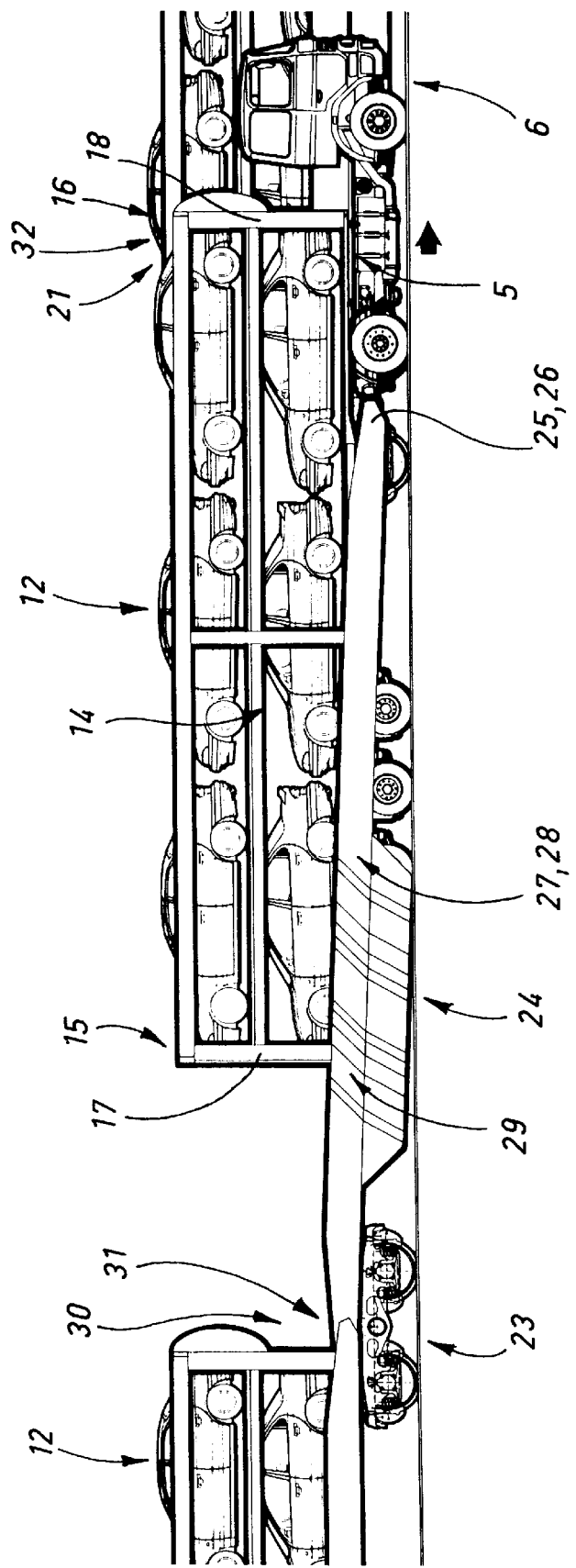
Figure 12:
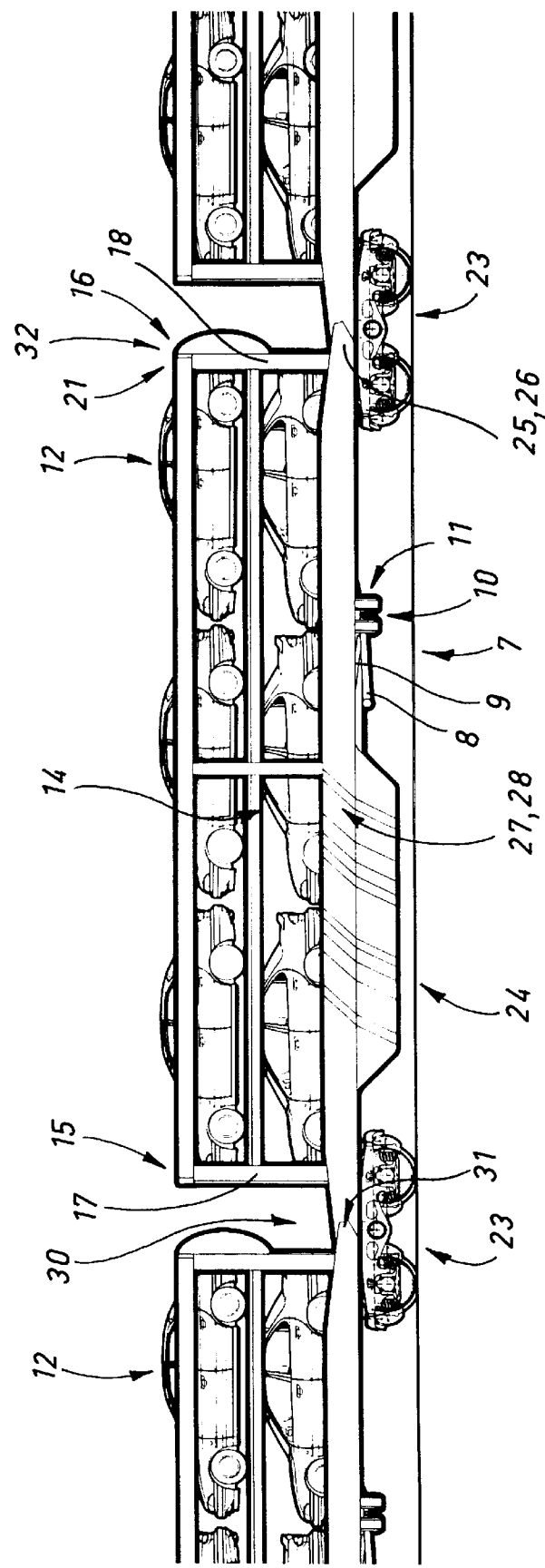

The phases of loading and unloading the semitrailer with cars are illustrated in FIGS. 3, 4 and 5.

After uncoupling, the semitrailer 1 rests on the ground 20 and is held in the horizontal position by its support and lifting means 7. To prepare it for the loading operations, the upper platform 14 is lowered at an inclination until it reaches a suitable inclined low position. The semitrailer is then itself inclined forwards by lowering the support and lifting means 7 until the front end 21 of the semitrailer touches the ground 20. The above series of operations may be effected in reverse order.

After the end ramp 19 has optionally been set in place, and lowering and then inclination of the upper platform 14 as far as the lowest position of its front end 22, the vehicles may be given access and be positioned on the upper platform 14. The latter is manoeuvred into the raised position once loaded. Loading then commences of the lower plane 13 which is inclined owing to the inclined position of the semitrailer itself. After removal of the optional ramp 19, the support and lifting means 7 is actuated to raise the semi-trailer into the horizontal position corresponding to its transportation position, as shown in FIG. 5.

Unloading is effected in exactly reverse order.

One of the main advantages of the semitrailer according to the invention relates to its positioning and participation in the manoeuvres for engaging and disengaging the bogie truck 23 and aligning and disaligning a wagon structure 24 on which it is placed. This advantage relates also to the positioning of loading and unloading vehicles 12 when the semitrailer is already or still in place on the wagon structure.

The positioning manoeuvres described below require temporary mechanical connecting means (not shown), for example for temporary support and fastening between the chassis of the semitrailer and the body of the railroad structure in such a way as to transmit to this railroad structure the upwards thrust and downwards slope necessary for the disengaging and then engaging movements of the ends 25, 26 of parallel arms 27, 28 forming side sills of the wagon structure in the immobilising receiving structures of the bogie truck 23.

These means of temporary mechanical connection and more particularly of temporary support and fastening may comprise different technical forms.

They may be simple brackets which are withdrawable, for example by folding, said brackets being provided with standardised bolts, for example those known in ISO standards as twistlocks, interacting with the ISO receiving members.

They may also be simple transverse elements for temporary mechanical connection designed to connect the longitudinal members of the chassis of the semitrailer to the longitudinal elements of the railroad structure.

They may additionally be transverse elements passing under the chassis of the semitrailer.

Many other equivalent means are possible.

In complementary manner, with reference to FIGS. 6 to 12, there will be described below the phases of transfer into one of the carrying railroad structures 24 of the type comprising a low flat receiving base 29 and a pivoting front end 30 interacting with a pin 31 of the bogie truck 23 and an open rear end 32 comprising two parallel arms 27 and 28 in the manner of a side sill. The ends 25 and 26 of these arms engage in receiving structures, present each side of the truck pin 31 and at the ends of a common coupling cross-member 33 carried pivotally by the center bearing for the pin of the bogie truck 23 common to two adjoining railroad structures.

To describe the putting in place of the semitrailer and the constitution of the train, the railroad structure 24 is assumed to be already in an oblique inclined position in which it is generally located for loading or unloading.

The semitrailer 1 is made to move in reverse by the tractor until it engages on the carrying railroad structure 24.

When its wheel and axle set 4 has arrived in position on the low flat base 29 of the wagon structure 24, the chassis 2 of the semitrailer is raised by the support and lifting means 7 so that it is possible to proceed with uncoupling. After uncoupling, the chassis is lowered as far as the wagon structure, which is in the oblique position, its front end on the ground. The temporary mechanical connection between the chassis and the wagon structure is established and the support and lifting means is actuated which, by resting on the ground, causes the assembly to rise high enough to permit, after pivoting or longitudinal connection movement, the engagement of the ends 25 and 26 of the side sill in the coupling receiving structures of the coupling cross-member 33 of the bogie truck 23.

The pivoting deflection movement is effected under the action of a lateral force coming, for example, from the drive of the wheels of the support and lifting means 7. This deflection movement is designed to bring the wagon structure 24, by a pivotal movement, into alignment with the train. It is then sufficient to raise the pivoting arm 8 to lower the ends of the side sill onto or into the receiving structures of the coupling cross-member 33 of the bogie truck 23.

Unloading is effected strictly in reverse. The assembly is raised, uncoupled and displaced obliquely.

When the tractor 6 and the semitrailer 1 have been set in the coupling position, the semitrailer is disconnected from the wagon structure and coupled to the tractor by its fifth wheel.

Naturally, it is possible to load or unload the transported vehicles directly, when the semitrailer has already been or is still in the wagon structure.

To do this, the mobile, inclinable upper platform 14 comes into play, via the lifting devices integral in the corner poles.

The semitrailer is placed in an inclined position in which its front end 21 touches the ground.

In the case of loading, the upper plane 14 is inclined as far as the lowest position of its front end, the access ramp 19 is optionally mounted on the front end 21 of the semitrailer and the cars 12 reach their position on the upper platform by their own means. The upper plane 14 is brought back to horizontal and then raised by means of the lifting system. The cars are brought onto the lower plane 13 and the semitrailer is tilted to horizontal by the support and lifting means 7.

Unloading is effected precisely in reverse. The cars are removed from the lower level first, after downwards inclination of the trailer. The same operation is effected with the upper platform 14 inclined forwards.

FIGS. 6 to 12 have as their aim the representation of the possibilities provided by this semitrailer in the context of transfer operations suitable for application to mixed rail/road transportation of semitrailers and in the particular case of vehicle transportation.

It should be emphasised that the aim of the invention relates not only to the type of disconnection from the railroad train by pivoting, but, on the contrary, disconnection from the train may also be effected by longitudinal movement.

In this case, only the lifting function of the support and lifting means is required.

I claim:

1. A method of transporting vehicles with a semitrailer in which said semitrailer comprises a chassis having a front end and a rear end, said chassis supporting a fixed lower platform and an upper platform which is movable from a loading position to a travel position and vice versa via an upper platform lifting and lowering device supported by poles of said chassis; a lowering and lifting mechanism being located proximate but spaced from said front end of said chassis, on an under surface thereof, for facilitating both raising and lowering said front end of said chassis and lateral motion of said front end of said chassis; and at least one wheel and axle set being supported between said lowering and lifting mechanism and said rear end of said chassis, on an undersurface thereof, for facilitating transportation of said semitrailer;

said method comprising the steps:
   inclining said semitrailer, via said lowering and lifting mechanism, until said front end of said chassis is located adjacent the ground;
   inclining said upper platform, via said upper platform lifting and lowering device, into said loading position located adjacent said lower platform;
   loading said upper platform with vehicles;
   raising said upper platform loaded with vehicles, via said upper platform lifting and lowering device, to said travel position;
   loading said lower platform with vehicles; and
   raising said semitrailer loaded with vehicles to a travel position via said lowering and lifting mechanism.

2. The method according to claim 1, further comprising the steps of:
   inclining said semitrailer forward, loaded with vehicles, until said front end of said chassis is located adjacent the ground;
   unloading the vehicles from said lower platform;
   lowering said upper platform with the vehicles loaded thereon, via said upper platform lifting and lowering device, to said loading position;
   unloading the vehicles from said upper platform;
   raising said upper platform, once the vehicles are unloaded therefrom, via said upper platform lifting and lowering device to the travel position; and
   raising said semitrailer to a travel position once the vehicles are unloaded therefrom.

3. The method according to claim 1, further comprising the step of forming said upper platform so that a front end thereof is inclinable to said loading position, located adjacent said lower platform, and a rear end thereof is pivotally mounted to said chassis.

4. The method according to claim 1, further comprising the step of providing a free end of said lowering and lifting mechanism with a rolling mechanism for contacting the ground and facilitating movement of said front end of said chassis.

5. The method according to claim 4, further comprising the step of providing said rolling mechanism with a motorized drive to facilitate desired lateral movement of said front end of said chassis.

6. The method according to claim 4, further comprising the step of aligning said rolling mechanism with said chassis in a fixed transverse orientation to facilitate desired lateral movement of said front end of said chassis.

7. The method according to claim 4, further comprising the step of providing said rolling mechanism with an assembly comprising a pair of wheels and supporting said pair of wheels so as to be freely rotatable to facilitate movement of said front end of said chassis in a desired direction.

8. The method according to claim 1, further comprising the step of providing an access ramp, at said front end of said chassis, to facilitate loading of vehicles onto said semitrailer when said front end of said chassis is located adjacent the ground.

9. A method of transporting vehicles with a semitrailer in which said semitrailer comprises a chassis having a front end and a rear end, said chassis supporting a fixed lower platform and an upper platform which is movable from a loading position to a travel position and vice versa; a lowering and lifting mechanism being located proximate said front end of said chassis, on an under surface thereof, for facilitating raising and lowering said front end of said chassis; and at least one wheel and axle set being supported between said lowering and lifting mechanism and said rear end of said chassis, on an undersurface thereof, for facilitating transportation of said semitrailer;

said method comprising the steps:
inclining said semitrailer, via said lowering and lifting mechanism, until said front end of said chassis is located adjacent the ground;
inclining said upper platform, via an upper platform lifting and lowering device, into said loading position;
loading said upper platform with vehicles;
raising said upper platform loaded with vehicles, via said upper platform lifting and lowering device, to said travel position;
loading said lower platform with vehicles;
raising said semitrailer loaded with vehicles to a travel position; using said semitrailer in combination with a rail car of a train;
supporting each opposed end of said rail car with two bogie trucks;
disengaging one end of said rail car from one of said two bogie trucks;
pivoting said disengaged one end of said rail car to a loading position about a pivot supported by the other bogie truck;
loading said semitrailer on a platform of said rail car;
securing said semitrailer to said rail car by at least one temporary mechanical connection;
raising said semitrailer and rail car combination via said lowering and lifting mechanism; and
realigning said semitrailer and rail car combination with said disengaged bogie truck and reconnecting said disengaged one end of said rail car with said one of said two bogie trucks.

10. The method according to claim 9 further comprising the step of:
disengaging said rail car, loaded with said semitrailer, from said one of said two bogie trucks;
pivoting said disengaged one end of said rail car to an unloading position;
unloading said semitrailer from said platform of said rail car; and
realigning and reconnecting said rail car with said disengaged bogie truck.

11. The method according to claim 9, further comprising the step of utilizing an assembly of withdrawable brackets as said at least one temporary mechanical connection.

12. The method according to claim 9, further comprising the step of utilizing an assembly of transverse elements, between a structure of said semitrailer and a structure of said rail car, as said at least one temporary mechanical connection.

13. A semitrailer for transporting vehicles, said semitrailer comprising:
a chassis having a front end and a rear end, said chassis supporting a fixed lower platform and an upper platform which is movable from a loading position to a travel position and vice versa via an upper platform lifting and lowering device supported by poles of said chassis;
a lowering and lifting mechanism being located proximate but spaced from said front end of said chassis, on an under surface thereof, for facilitating both raising and lowering said front end of said chassis and lateral motion of said front end of said chassis; and
at least one wheel and axle set being supported between said lowering and lifting mechanism and said rear end of said chassis, on an undersurface thereof, for facilitating transportation of said semitrailer;
wherein said lowering and lifting mechanism facilitates inclination of said semitrailer to a loading position where said front end of said chassis is located adjacent the ground; and said upper platform lifting and lowering device facilitates inclination of said upper platform into said loading position where said upper platform is loadable with vehicles; and once said upper platform is loaded with vehicles, said upper platform lifting and lowering device raises said upper platform to said travel position whereby said lower platform is then loadable with vehicles; and, after loading the semitrailer loaded with vehicles, said semitrailer is raised to a travel position by said lowering and lifting mechanism.

14. The semitrailer according to claim 13, wherein said upper platform is formed so that a front end thereof is inclinable to said loading position and a rear end thereof is pivotably mounted to said chassis.

15. The semitrailer according to claim 13, wherein a free end of said lowering and lifting mechanism is provided with a rolling mechanism for contacting the ground and facilitating movement of said front end of said chassis.

16. The semitrailer according to claim 15, wherein said rolling mechanism is provided with a motorized drive to facilitate desired lateral movement of said front end of said chassis.

17. The semitrailer according to claim 15, wherein said rolling mechanism is aligned with said chassis in a fixed transverse orientation to facilitate desired lateral movement of said front end of said chassis.

18. The semitrailer according to claim 15, wherein said rolling mechanism is provided with an assembly comprising a pair of wheels and said pair of wheels are supported so as to be freely rotatable to facilitate movement of said front end of said chassis in a desired direction.

19. The semitrailer according to claim 13, wherein an access ramp is provided, at said front end of said chassis, to facilitate loading of vehicles onto said semitrailer when said front end of said chassis is located adjacent the ground.

* * * * *